N. POWER.
APPARATUS FOR EXHIBITING MOVING PICTURES.
APPLICATION FILED DEC. 22, 1917.
1,355,569.
Patented Oct. 12, 1920.
2 SHEETS—SHEET 2.
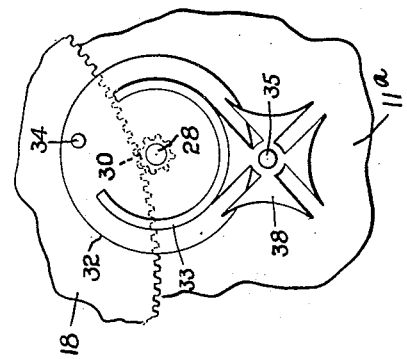
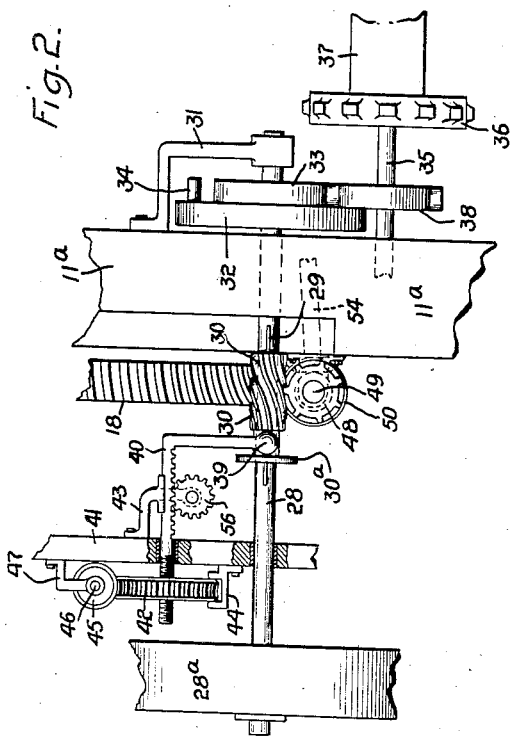
Nicholas Power
INVENTOR.
BY
ATTORNEY.

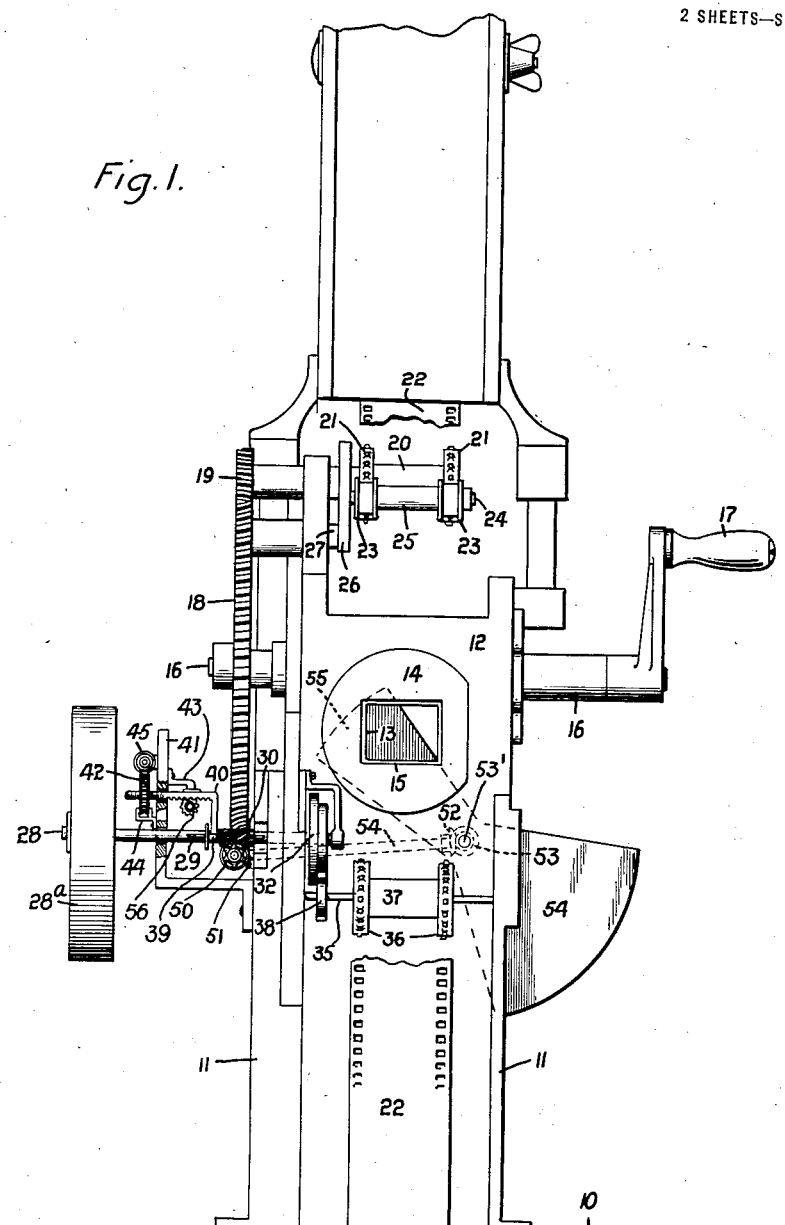

UNITED STATES PATENT OFFICE.

NICHOLAS POWER, OF BROOKLYN, NEW YORK, ASSIGNOR TO EDWIN J. HADLEY, OF NEW YORK, N. Y.

APPARATUS FOR EXHIBITING MOVING PICTURES.

1,355,569.        Specification of Letters Patent.        Patented Oct. 12, 1920.

Application filed December 22, 1917. Serial No. 208,338.

*To all whom it may concern:*

Be it known that I, NICHOLAS POWER, a citizen of the United States of America, residing at Brooklyn, in the county of Kings, State of New York, have invented certain new and useful Improvements in Apparatus for Exhibiting Moving Pictures, of which the following is a specification.

My invention relates to apparatus for exhibiting moving pictures, and more particularly to apparatus for projecting upon a screen pictures arranged in series upon a translucent film which is fed intermittently across a projection aperture in front of a suitable source of light used for illumination of the pictures.

The invention relates to means for framing the pictures, or accurately registering the same in relation to the projection aperture. The principal object of the invention is to provide simply constructed and efficiently operating means for quickly and accurately framing the pictures so as to secure proper projection thereof.

The invention may be applied to practically any standard type of projecting machine, and as illustrating its application I have selected the type of machine forming the subject matter of Letters Patent 826,112 granted to me on July 17, 1906.

In the accompanying drawings, in which only so much of a projecting machine is shown as is required for a clear understanding of the present invention, Figure 1 is a rear elevational view of a projecting machine having my improvement applied thereto;

Fig. 2 is a fragmentary elevational view of the framing mechanism; and

Fig. 3 is a similar view of a portion of the gearing for effecting feeding of the film.

In machines of the type herein contemplated, the lower feed spool for the film is intermittently actuated through the medium of a Geneva movement comprising what is termed a "pin wheel" and an ordinary Geneva stop wheel, and stated in general terms, my invention comprises means for so adjusting the pin wheel that its coöperation with the stop wheel will be varied in point of time in a manner to correct any defect in the framing of the pictures in relation to the projection opening. The means for adjusting the pin wheel is also operatively connected with the shutter which controls the projection aperture, so that the movement of the shutter is synchronized with that of the film feeding mechanism.

Referring to the drawings, 10 denotes the base board having secured thereto the standards 11 which carry the apparatus. Mounted upon the standards 11 is the rear frame 12 having the projection aperture 13 formed therein. Upon the rear of the frame 12 is a screen 14 which serves as a protection against overheating of the frame 12 about the aperture 13 and is provided with an aperture 15 slightly larger than but coincident with the aperture 13.

Traversing the machine from side to side, somewhat above the projection aperture 13, is the crank shaft 16 provided with the operating handle 17. In the form of apparatus shown, there is rigidly mounted on the shaft 16, at the end opposite that carrying the handle 17, a large worm wheel 18 which is in permanent mesh with a smaller worm wheel 19 secured to a short shaft 20 upon which the upper film-feeding sprocket wheels 21 are carried. When the shaft 16 is rotated these sprockets are continuously driven, and feed the film 22 toward the projection aperture 13. The film is held in engagement with the sprockets 21 by a pair of grooved rollers 23 mounted on a short shaft 24 and connected by a sleeve 25. The shaft 24 is carried by a rocking lever 26 fulcrumed on a pivot 27, and this lever may be rocked to move the rollers 23 away from or against the sprockets 21.

Below the projection aperture 13 and bearing in a side wall 11ª of the machine is a short shaft 28, having a key-way 29 into which extends a key (not shown) formed interiorly upon a worm sleeve 30 which is slidable upon but not rotatable about the shaft 28. The worm wheel 18 is in mesh with the worm sleeve 30. The inner end of shaft 28 is supported by a bracket 31 secured to the wall 11ª, and secured to the shaft 28, adjacent to the bracket, is a pin wheel comprising a disk 32, an open guide ring 33 on a lateral face of the disk, and a laterally projecting stud 34 spaced equidistantly between the ends of the ring 33. The shaft 28 also carries the fly wheel 28ª.

Bearing in the standards 11, below and parallel to the shaft 28 is a shaft 35 carrying the lower film feeding sprockets 36 connected by the sleeve 37. The upper film feeding devices including the sprockets 21 are constant in operation and serve mainly to maintain a sufficient amount of slack in the film above the guiding and tension devices (not herein shown) by which it is held in proper relation to the projection aperture 13. The lower film feeding devices, including the sprockets 36, are intermittent in operation and serve to draw the film across the projection aperture at suitable intervals to permit the picture on the film to be projected upon a screen and displayed to view while stationary. To secure intermittent operation of the sprockets 36 there is secured upon the shaft 35 a Geneva stop wheel or star wheel 38 in position to be actuated by the stud 34 on the pin wheel. The Geneva wheel has four slots which are successively engaged by the stud 34, and it will be obvious that the Geneva wheel 38 and the shaft upon which it is rigidly secured will make one complete revolution to each four revolutions of the pin wheel.

The outer end of the worm sleeve 30 is reduced in diameter and terminates in a collar 30ª. Engaging the reduced portion of the sleeve 30 is the forked end 39 of a rack bar 40 which bears in a bracket 41 and has an outer threaded end upon which a worm wheel 42 is mounted. A supplemental bracket 43 is provided to steady the rack bar 40, and a guide 44 is carried by bracket 41 to prevent side deflection of the worm wheel 42. Engaging the worm wheel 42 is a second worm wheel 45, fixed to a shaft 46 supported in a bearing 47 secured to the bracket 41. The shaft 46 extends at right angles to the axis of the rack bar 40.

In mesh with the worm sleeve 30 is a worm wheel 48 carried upon a shaft 49 extending at right angles to the shaft 28. Fixed to the shaft 49 is a bevel pinion 50 meshing with a miter pinion 51 fixed to one end of a shaft 54, extending substantially at right angles to the shaft 49, and carrying at its other end, a bevel pinion 52 meshing with a miter pinion 53 fixed to one end of a shaft 53' to which the shutter for controlling the projection aperture 13 is secured. In the drawing I have shown a special form of shutter, as described in my earlier patent, and which comprises two oppositely-arranged blades or wings 54 and 55 of which the former is considerably wider than the latter. The purpose of this construction is fully explained in Patent 826,112 and need not be repeated here, it being necessary merely to point out that the shaft 53' is driven from the shaft 49 and the shutter movement is to be synchronized with the feed of the film.

Engaging the teeth of the rack bar 40 is a pinion 56 which may be rotated to move the rack bar back and forth, thus serving the same purpose as the worm wheels 42 and 45.

The operation of the device has been indicated, to some extent, in the foregoing description, and following is a brief statement of the operation of the special feature of my invention:—If it be assumed that a picture is not properly framed, i. e. does not properly register with the projection aperture 13, such defect in framing may be immediately corrected by turning the worm 45, whereby the gear sleeve 30 will be axially moved causing the shaft 28 to rotate while the gears 18 and 30 remain in mesh. The pin wheel being rigid on the shaft 28, the pin or stud 34 will be moved angularly a suitable extent so that when it coöperates with the slots of the Geneva stop wheel 38 the film feeding sprockets 36 will be rotated the requisite amount to accurately frame each picture of the film 22 in the projection aperture 13. Ordinarily relatively slight adjustment of the picture is necessary to effect proper framing, and it will be apparent that this adjustment is accomplished in a most simple manner by the mere turning of either the worm 42 or the pinion 56 as may be preferred, although usually it is preferred to turn the worm 42 and thereby impart the requisite movement to the gear sleeve 30. Inasmuch as the shutter operating shaft is geared to the shaft 28 it will be obvious that the shutter and film will move synchronously.

It is not my purpose to limit the invention to the precise details shown and described, as considerable variation and modification may be effected by those skilled in the art without departing from the scope of the appended claims.

What I claim as new and desire to secure by Letters Patent is:—

1. In apparatus for exhibiting moving pictures, the combination with film feeding devices, comprising upper and lower sprockets and shafts upon which the same are mounted, means for continuously rotating the upper sprocket, means for intermittently rotating the lower sprocket comprising a pin wheel and a Geneva stop wheel, a main driving gear, a gear sleeve in engagement with said main driving gear, and means for simultaneously rotating and moving said gear sleeve lengthwise while in engagement with said main driving gear for rotating said pin wheel to vary its relation to the slots of the Geneva stop wheel, said last named means comprising a rack bar having a depending arm engaging said gear sleeve.

2. In apparatus for exhibiting moving pictures, the combination of a lower film feeding sprocket, a shaft upon which the same is mounted, a Geneva stop wheel on said shaft, a second shaft parallel to the first mentioned shaft, a pin wheel on said second shaft adapted to co-act with the Geneva stop wheel, a gear sleeve on said second mentioned shaft, a main driving gear engaging said gear sleeve, and a longitudinally movable rack bar having a depending bifurcated arm engaging said gear sleeve for rotating and axially moving said gear sleeve to vary the relation of the pin wheel to the Geneva stop wheel.

3. In apparatus for exhibiting moving pictures, the combination of a lower film feeding sprocket, a shaft upon which the same is mounted, a second shaft parallel to the said first mentioned shaft, a Geneva stop wheel upon said first mentioned shaft, a pin wheel on said second mentioned shaft in position to coact with said Geneva stop wheel, a main driving gear, a gear sleeve on said second mentioned shaft in mesh with said main driving gear, a rack bar having a depending bifurcated end adapted to engage said gear sleeve, and means for reciprocating said rack bar to move said gear sleeve back and forth on the shaft on which it is mounted, to rotate said shaft and move the pin wheel to vary the relation of the latter to the Geneva stop wheel.

In testimony whereof I have affixed my signature in presence of two witnesses.

NICHOLAS POWER.

Witnesses:
BERTHA MUELLER,
CLARICE FRANCK.